United States Patent
Xu (10) Patent No.: US 9,316,104 B2
(45) Date of Patent: Apr. 19, 2016

(54) FILM COOLING CHANNEL ARRAY HAVING ANTI-VORTEX PROPERTIES

(71) Applicant: United Technologies Corporation, Hartford, CT (US)

(72) Inventor: JinQuan Xu, Groton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 628 days.

(21) Appl. No.: 13/660,148

(22) Filed: Oct. 25, 2012

(65) Prior Publication Data
US 2014/0116666 A1 May 1, 2014

(51) Int. Cl.
| | | |
|---|---|---|
| *F28F 3/12* | (2006.01) | |
| *F01D 5/18* | (2006.01) | |
| *F01D 9/06* | (2006.01) | |
| *F23R 3/00* | (2006.01) | |

(52) U.S. Cl.
CPC ............. *F01D 5/186* (2013.01); *F01D 9/065* (2013.01); *F23R 3/002* (2013.01); *F05D 2240/81* (2013.01); *F05D 2260/202* (2013.01); *F23R 2900/03042* (2013.01); *Y02T 50/676* (2013.01)

(58) Field of Classification Search
CPC ... F01D 5/186; F01D 5/187; F05D 2250/711; F05D 2260/202; Y02T 50/676
See application file for complete search history.

(56) References Cited

U.S. PATENT DOCUMENTS

| | | | |
|---|---|---|---|
| 4,705,455 A | | 11/1987 | Sahm et al. |
| 4,992,025 A | * | 2/1991 | Stroud et al. ................. 416/97 R |
| 5,062,768 A | | 11/1991 | Marriage |
| 5,326,224 A | | 7/1994 | Lee et al. |
| 5,419,681 A | | 5/1995 | Lee |
| 6,092,982 A | | 7/2000 | Ikeda et al. |
| 6,155,778 A | * | 12/2000 | Lee et al. ....................... 415/116 |
| 7,273,351 B2 | * | 9/2007 | Kopmels ..................... 416/97 R |
| 7,328,580 B2 | | 2/2008 | Lee et al. |
| 7,637,462 B2 | * | 12/2009 | Pal .............................. 416/90 R |
| 7,665,956 B2 | * | 2/2010 | Mitchell et al. ................ 415/115 |
| 8,079,810 B2 | | 12/2011 | Liang |
| 8,128,366 B2 | | 3/2012 | Strock et al. |
| 8,231,330 B1 | | 7/2012 | Liang |
| 8,449,254 B2 | * | 5/2013 | Devore et al. ...................... 416/1 |
| 2008/0003096 A1 | | 1/2008 | Kohli et al. |

OTHER PUBLICATIONS

International Search Report and Written Opinion for related International Application No. PCT/US13/57034; report dated May 12, 2014.
Supplementary European Search Report for Application No. 13856525.4 dated Dec. 10, 2016.

* cited by examiner

*Primary Examiner* — Igor Kershteyn
(74) *Attorney, Agent, or Firm* — Cantor Colburn LLP (57) ABSTRACT

A cooling channel array carried by a component wall of a gas turbine engine is provided. The cooling channel array comprises a diffusion cavity and a metering section. The metering section comprises a main hole and two or more side holes. The side holes may be separate from the main hole or may branch off of the main hole. The diffusion cavity may incorporate a lobed configuration to help diffuse cooling fluid as it exits the cooling channel array.

20 Claims, 6 Drawing Sheets

FILM COOLING CHANNEL ARRAY HAVING ANTI-VORTEX PROPERTIES

TECHNICAL FIELD

The subject matter of the present disclosure relates generally to film cooling. More particularly, the subject matter of the present disclosure relates to a film cooling channel array having anti-vortex properties for improved cooling of surfaces within gas turbine engines.

BACKGROUND

Gas turbine engines such as those used on jet aircraft generally comprise an air inlet, a single or multi-stage compressor, a combustion chamber aft of the compressor, a turbine and an exhaust nozzle. Air entering the inlet flows through the compressor and into the combustion chamber where it provides oxygen for fuel combustion. The hot combustion gases pass through the turbine and exit the exhaust nozzle, providing thrust.

Modern gas turbine engines employ very high working temperatures in order to increase engine operating efficiency. These high temperatures pose a risk of damage to engine components such as turbine blades and vanes. High melting point super-alloys and thermal barrier coatings have been used to avoid thermally induced damage, but operating temperatures can still exceed super-alloy melting points, and coatings can become damaged or otherwise fail over time.

Cooling fluids also may be used to protect engine components exposed to high temperature. One method of using cooling fluids is impingement cooling, which involves directing a relatively cool fluid, such as compressor bleed air, against a surface of a component exposed to high temperatures in order to absorb thermal energy into the cooling fluid which is then carried away from the component. Another method of using cooling fluids is film cooling. Film cooling involves providing a flow of relatively cool fluid from film cooling holes in order to create a thermally insulative barrier between a surface of a component and a relatively hot fluid flow.

For example, turbine blades may be equipped with cooling holes along the turbine blade perimeter. Cooling air from, say, a compressor bleed system, may be ejected through the cooling holes to provide a thermally insulative barrier along a portion of the blade.

A difficulty exists in maintaining a steady film of cooling air across the surface to be cooled. For example, cooling holes can create a vortex of cooling air that draws the hot air against the surface to be cooled instead of away from the surface.

Thus there is a need for an improved film cooling system that provides a steady film of cooling air across the surface to be cooled.

SUMMARY

According to one embodiment of the present disclosure, a cooling channel array carried by a component wall of a gas turbine engine is provided. The component wall has a first surface and a second (cooling) surface and may be part of a turbine blade, a turbine vane or any other suitable component. The cooling channel array comprises a diffusion cavity and a metering section. The diffusion cavity is defined by a face carried by the component wall and has an outlet on the second surface. The metering section comprises a main hole and two or more side holes. The main hole has an inlet on the first surface and an outlet located on the face of the diffusion cavity. Each side hole has an inlet and an outlet located on the face of the diffusion cavity.

In one embodiment at least one of the side hole inlets is located on the first surface. Preferably all of the side hole inlets are located on the first surface. The preferred number of side holes is two. The side holes may or may not be parallel to the main hole.

In a refinement of the invention the main hole and the side holes each have a constant cross-sectional area, where the cross-sectional area is the area of a planar surface normal to the axis of each hole.

In another refinement the main hole and the side holes each have a diameter, and the diameters of the side holes are smaller than the diameter of the main hole.

In another refinement the side hole outlets are laterally aligned with the main hole outlet.

In another refinement the side hole outlets are laterally upstream or downstream of the main hole outlet.

In another refinement the diffusion cavity comprises two or more lobes, each lobe partly defined by a raised, contoured wall. The diffusion cavity may have a central axis and each lobe may have a lobe axis. The lobe axes may diverge from the central axis.

In a second embodiment of the invention at least one of the side holes, and preferably every side hole, branches off of the main hole. Again, the preferred number of side holes is two.

In a refinement of the second embodiment the main hole and the side holes each have a constant cross-sectional area.

In another refinement the main hole and the side holes each have a diameter, and the diameters of the side holes are smaller than the diameter of the main hole.

In another refinement the side hole outlets are laterally aligned with the main hole outlet.

In another refinement the side hole outlets are laterally upstream or downstream of the main hole outlet.

In another refinement the diffusion cavity comprises two or more lobes, each lobe partly defined by a raised, contoured section on the face of the diffusion cavity. The diffusion cavity may have a central axis and each lobe may define a lobe axis. The lobe axes may diverge from the central axis.

In another refinement the diffusion cavity comprises a first lobe defining a first lobe axis and a second lobe defining a second lobe axis. One side hole is aligned with the first lobe axis, and another side hole is aligned with the second lobe axis.

BRIEF DESCRIPTION OF THE DRAWINGS

So that the manner in which the above recited concepts of the present disclosure may be understood in detail, a more particular description is provided by reference to the embodiments, which are illustrated in the accompanying drawings. It is to be noted, however, that the appended drawings illustrate only typical embodiments and are therefore not to be considered limiting of its scope, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which.

DETAILED DESCRIPTION

In the description that follows like structures may share the same element number.

The present invention is an improved film cooling system for use in gas turbine engines and other mechanical equipment. The film cooling system comprises multiple cooling channel arrays, at least one of the cooling channel arrays comprising a metering section comprising multiple metering holes that merge into a diffusion cavity. The diffusion cavity may be multi-lobed. The cooling channel arrays may be carried by (located in) any component wall that needs to be cooled.

Although the cooling system of the present invention will now be described with regard to a turbine blade cooling system, it should be understood that the cooling system may be used to cool any component that requires cooling, including but not limited to gas turbine engine combustor liners, blade outer air seals (BOAS), turbine blades and vanes, and augmenters. Further, although the cooling system is described as using cooling air from the compressor, it should be understood that the system can be used with any suitable cooling fluid, including relatively cooler air from elsewhere in the engine or steam.

Figure 1:
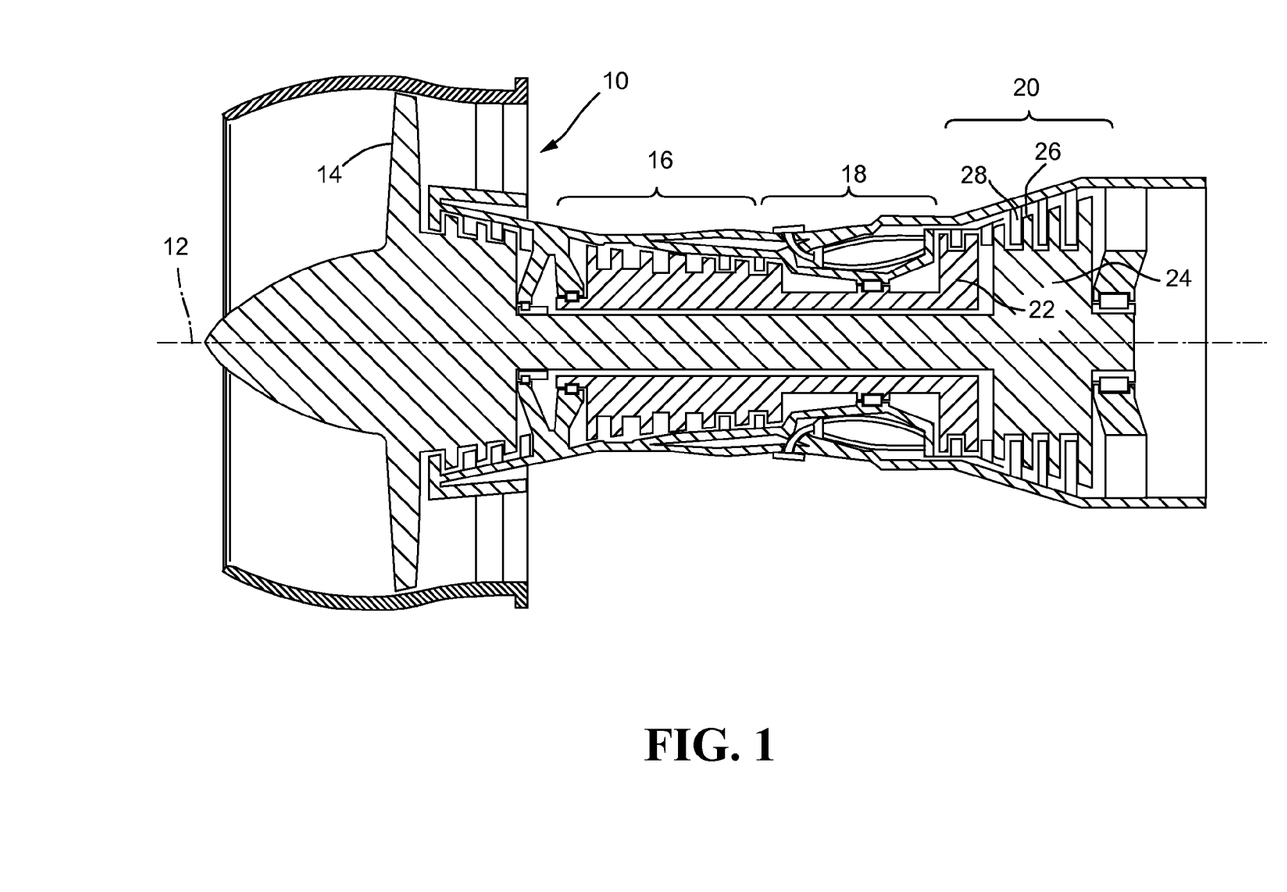
FIG. 1 is a longitudinal sectional view of an exemplary gas turbine engine that may be equipped with the film cooling system of the present invention.

FIG. 1 is a longitudinal sectional view of an exemplary gas turbine engine 10 that may be equipped with the film cooling system of the present invention. The engine 10 is circumferentially disposed about a center line 12 and comprises a fan 14, a compressor 16, a combustion chamber 18 and a turbine 20 that provides rotational power to the fan 14 and compressor 16. Air entering the engine 10 travels into the compressor 16 where it undergoes compression, then into the combustion chamber 18 where it is mixed with fuel and ignited to produce hot combustion gases which pass through the turbine 20. The turbine includes high and low pressure rotors 22, 24 that, in response to the expansion and flow of the combustion gases, rotate, driving the compressor 16 and fan 14. The gases exit through the exhaust nozzle to provide engine thrust. A significant amount of thrust may be provided by a bypass flow path due to a high bypass ratio. In some engines the turbine 20 drives the fan 14 through a geared architecture (not shown) to achieve a high bypass ratio and reduced thrust specific fuel consumption.

Figure 2:
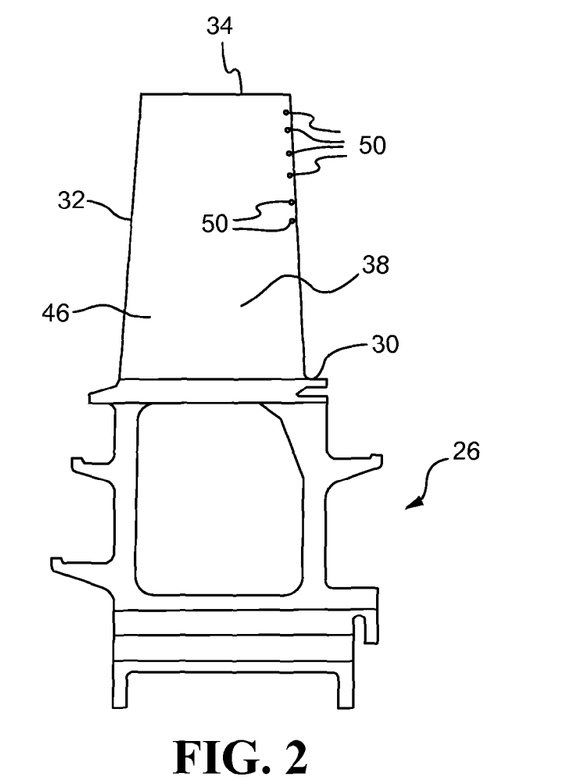
FIG. 2 is a view of a single turbine blade.

The turbine 20 comprises alternating rows of rotary blades 26 and static vanes 28. FIG. 2 is a view of a single turbine blade 26 having a platform 30. The turbine blade 26 comprises a generally curved airfoil 32 extending radially from the platform 30. The turbine blade 26 may be protected from heat generated in the combustion chamber 18 via a thermal barrier coating.

Figure 3:
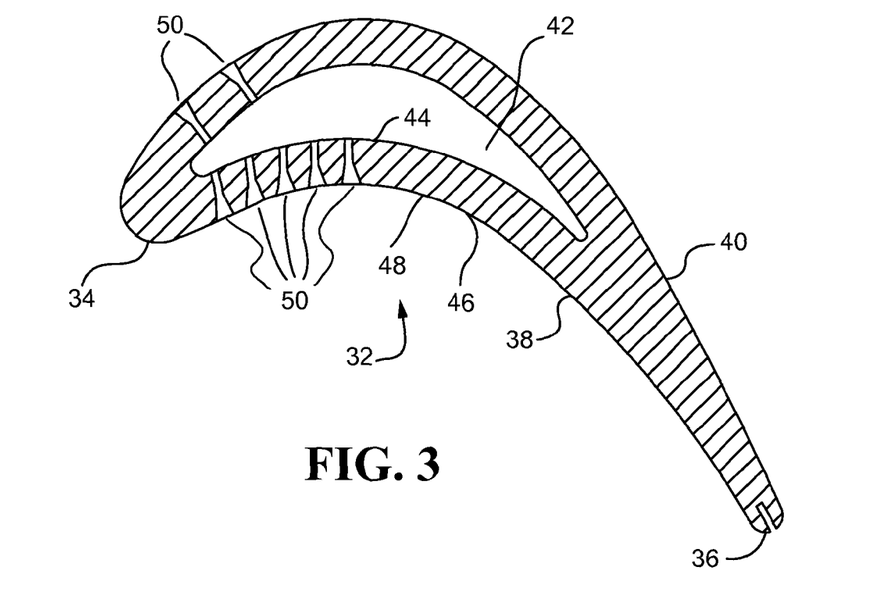
FIG. 3 is a cross-sectional view of the turbine blade of FIG. 2.

FIG. 3 is a cross-sectional view of the turbine blade airfoil 32 of FIG. 2. The airfoil 32 has a leading edge 34, a trailing edge 36, a pressure side 38 and a suction side 40. The airfoils 32 are subjected to very high temperatures which require cooling, with the pressure side 38 typically contacting hotter gases than the suction side 40. The airfoil blade 32 may be at least partially hollow, and may include one or more channels 42 through which cooling air may pass before exiting through cooling channel arrays 50. The size, number and location of the cooling channel arrays 50 may vary.

The airfoil 32 may be formed from a super-alloy or any suitable material, and may be covered in a thermal barrier coating to aid in the cooling. In the airfoil 32 shown in FIG. 3 a portion of the pressure side 38 is formed by a wall 48 having a first surface, for example an inner surface 44, a second surface, for example an opposing outer surface 46, and a thickness. The generally concave outer surface 46 of the wall 48 is exposed to hot gases from the combustion chamber. The wall 48 carries a plurality of cooling channel arrays 50, five of which are shown.

Many different cooling holes have been designed to more efficiently cool the surfaces of a rotary blade airfoil 32. One disadvantage of some film cooling holes, such as round cooling holes, is the tendency to produce a pair of counter-rotating vortices which causes the cooling air to separate from the hot surface at sufficiently high cooling air flow rates, thereby reducing cooling efficiency. Varying the size and shape of the cooling hole is one way to reduce this cooling flow separation phenomenon. For example, expanding the shape of the cooling air outlet in the axial (cooling air stream flow) direction and/or the lateral direction tends to reduce cooling air velocity and thus cooling air/surface separation. Changing the perimeter shape of the cooling air outlet from, say, a circular or oval shape to more complex shapes has also been proposed.

Still other methods have been proposed to reduce or eliminate the counter-rotating vortices which cause cooling flow separation. For example, NASA's Glenn Research Center in Cleveland, Ohio has proposed an anti-vortex cooling channel array in which side holes branch off of a main cooling hole in what may be referred to as a "tri-hole configuration." In one tri-hole configuration cooling air enters through a single cooling air inlet before separating into a main hole and two branch holes. Air passing through the main hole exits a main cooling air outlet while air passing through the branch holes exits two side outlets. The side outlets may be laterally aligned with (adjacent) the main outlet or may be upstream of the main outlet. The cooling flow from the side outlets produces a strong upwash that counterbalances a net downwash in the main outlet, reducing or eliminating the counter-rotating vortices. The present disclosure advances this anti-vortex technology further.

Figure 4:
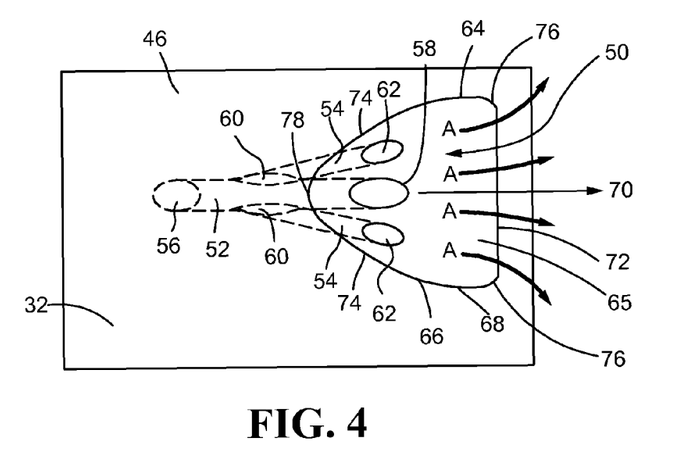
FIG. 4 is a top plan view of a component wall having a cooling channel array according to the invention.
Figure 5:
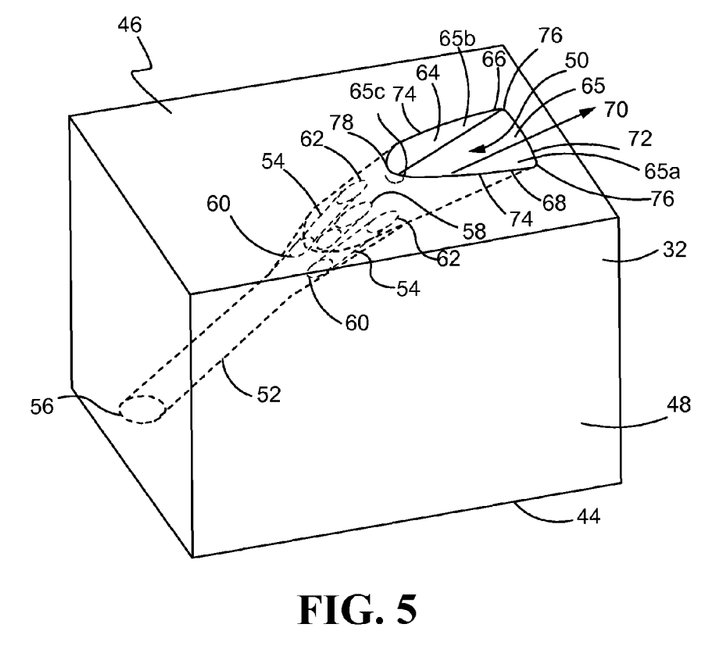
FIG. 5 is a sectional view of the component wall of FIG. 4.

FIGS. 4 and 5 illustrate an example of a cooling channel array 50 formed within the wall 48 of a component such as the turbine blade airfoil 32 of FIGS. 2 and 3. The cooling channel array 50 extends through the thickness of the wall 48 from an inlet 56 located on the inner surface 44 of the wall 48 to an outlet 66 located on the outer surface 46 of the wall 48. Typically, cooling air from the compressor 16 flows through the cooling channel arrays 50 to provide a thermally insulative barrier along a portion of the airfoil 32.

The cooling channel array 50 comprises a diffusion cavity 64 and a metering section. The diffusion cavity 64 is defined by a face 65 carried by the component wall 48. The diffusion cavity face 65 congruently forms into the outer surface 46 of the wall 48 at a perimeter 68 that defines the outlet 66. Generally, the shape of the diffusion cavity 64 functions to expel a blanket of cooling air onto the outer surface 46 of the component being cooled. The face 65 of the diffusion cavity 64 may be generally concave and generally comprises a bottom surface 65*a*, opposing side surfaces 65*b* and a top surface 65*c* (FIG. 5).

The metering section comprises a main hole 52 and two or more side holes 54. The main hole 52 extends from the inlet 56 on the inner or first surface 44 to an outlet 58 located on the face 65 of the diffusion cavity 64.

Each side hole 54 has an inlet 60 and extends continuously to an outlet 62 located on the face 65 of the diffusion cavity 64. In the embodiment shown in FIGS. 4 and 5 each side hole 54 branches off of the main hole 52 at the side hole inlet 60.

The main hole 52 and the side holes 54 may each have a constant cross-sectional area. By contrast, the cross-sectional area of the diffusion cavity 64 may increase in the direction of the outlet 66. The main hole 52 may have any suitable cross section, including but not limited to circular, oval, crescent, elliptical and racetrack (oval with two parallel straight sides). The side holes 54 typically have a circular cross section, but other shaped cross sections are also contemplated. The diameters of the two side holes 54 typically are smaller than the diameter of the main hole 52. For example, the diameters of the side holes 54 may be between 0.5 and 0.72 times as large as the diameter (hydraulic diameter if the cross section is not circular) of the main hole 52. The diameters of the two side holes 54 typically are substantially the same size, but they could be different.

The outlets 62 of the two side holes 54 may be laterally aligned with the main hole outlet 58, or upstream of, or downstream of, the main hole outlet 58. The outlets 62 of the two side holes 54 may be located on the bottom surface 65*a*, top surface 65*b*, or the two side surfaces 65*c* of the face 65 of the diffusion cavity 64.

The diffusion cavity 64 is downstream of the main hole 52 and side holes 54 and defines an axis such as a central axis 70. Some cooling air diffuses away from the central axis 70 in the lateral direction before exiting the cooling channel array 50 through the outlet 66 as indicated by the arrows A in FIG. 4. This diffuse pattern helps generate a layer of cooling air across the hot outer surface 46 of the wall 48.

In the illustrated embodiment the perimeter 68 is roughly triangular and comprises a trailing edge 72 and two opposing lateral edges 74 that extend from each end 76 of the trailing edge 72 and converge at an apex 78.

The anti-vortex configuration of the cooling channel array 50 of FIGS. 4 and 5 effectively cancels detrimental vorticity produced by the main hole 52. The diffusion cavity 64 further produces a more flattened, wider flow of cooling air across the surface of the component being cooled. The diffusion cavity 64 also prolongs the vortex free film of previous designs.

Figure 6:
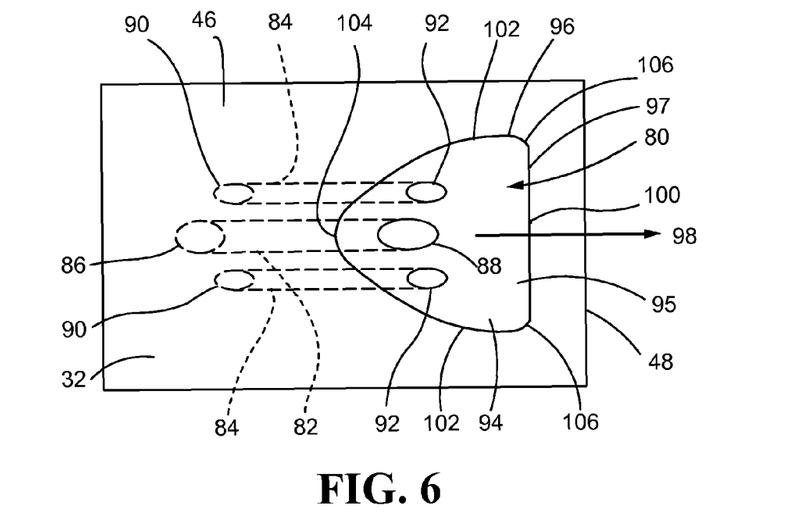
FIG. 6 is a top plan view of a component wall having a cooling channel array according to an alternative embodiment of the invention.
Figure 7:
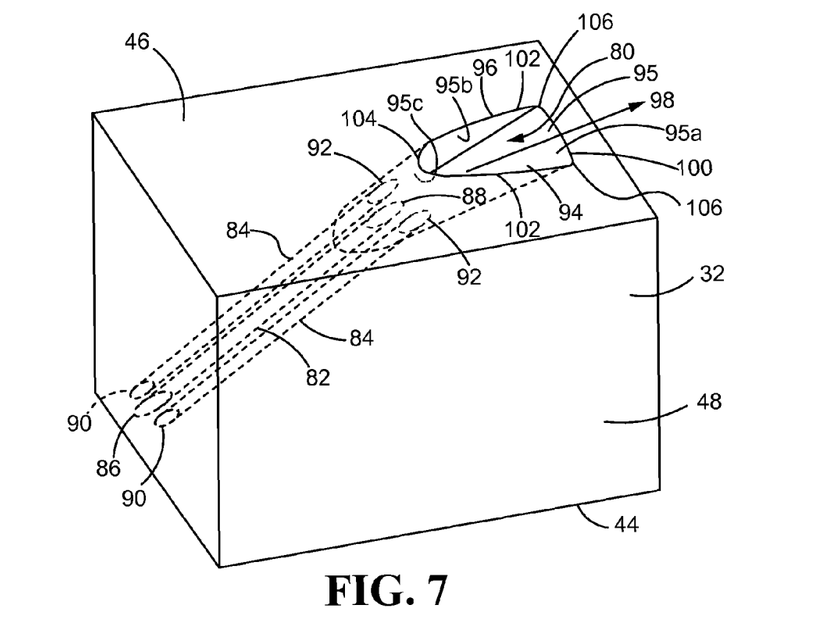
FIG. 7 is a sectional view of the component wall of FIG. 6.

FIG. 6 is a top plan view of a component wall 48 having an alternative cooling channel array 80. FIG. 7 is a sectional view of the component wall 48 of FIG. 6. The cooling channel array 80 comprises a diffusion cavity 94 and a metering section.

As in the previous embodiment the diffusion cavity 94 is defined by a face 95 carried by the component wall 48. The diffusion cavity face 95 congruently forms into the outer surface 46 of the wall 48 at a perimeter 97 that defines an outlet 96. The face 95 of the diffusion cavity 94 generally comprises a bottom surface 95*a*, opposing side surfaces 95*b* and a top surface 95*c* (FIG. 7). The diffusion cavity 94 defines an axis such as a central axis 98. Cooling air diffuses within the diffusion cavity 94 away from the central axis 98 before exiting the cooling channel array 80 through the outlet 96. The outlet perimeter 97 is approximately triangular and comprises a relatively straight trailing edge 100 and two slightly arcuate opposing lateral edges 102 that extend from each end 106 of the trailing edge 100 and converge at an apex 104.

The metering section comprises a main hole 82 and two side holes 84. Unlike the cooling channel array 50 of FIGS. 4 and 5, the side holes 84 are separate from the main hole 82. That is, the main hole 82 and each side hole 84 has a separate inlet and outlet. The main hole 82 extends from a main hole inlet 86 located on the inner surface 44 of the wall 48 to a main hole outlet 88 located on the face 95 of the diffusion cavity 94. Each side hole 84 extends from a side hole inlet 90 located on the inner surface 44 of the wall 48 to a side hole outlet 92 located on the face 105 of the diffusion cavity 94.

The side holes 84 may or may not be parallel to the main hole 82. The main hole 82 and the side holes 84 each may have a constant cross-sectional area. Each of the side holes 84 may or may not have a smaller cross-sectional area than the main hole 82. The outlets 62 of the two side holes 54 may be laterally aligned with the main hole outlet 58, or upstream of, or downstream of, the main hole outlet 58. The outlets 92 of the two side holes 84 may be on the bottom surface 95*a*, top surface 95*c*, or the two side surfaces 95*b* that define the diffusion cavity 94.

Like the embodiment of FIGS. 4 and 5, it is believed that this configuration having two separate side holes 82 effectively cancels detrimental vorticity produced by the main hole 82. The diffusion cavity 94 further produces a more flattened, wider flow of cooling air across the surface of the component being cooled. The diffusion cavity 94 also prologs the vortex free film of previous designs.

Figure 8:
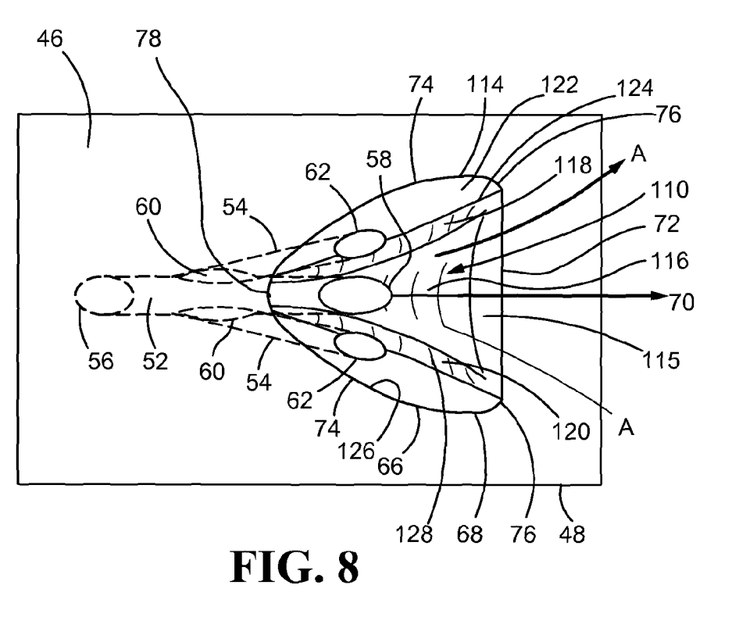
FIG. 8 is a top plan view of a component wall having a cooling channel array according to another alternative embodiment of the invention.

FIG. 8 is a top plan view of a component having an alternative cooling channel array 110 formed within a wall 48 of the component. The cooling channel array 110 in FIG. 8 is basically a lobed version of the cooling channel array 50 of FIGS. 4 and 5 and, more specifically, a two-lobed version.

Like the embodiment shown in FIGS. 4 and 5, the cooling channel array 110 extends through the thickness of the wall 48 from an inlet 56 located on the inner surface of the wall 48 to an outlet 66 located on the outer surface 46 of the wall 48. The cooling channel array 110 has a diffusion cavity 114 and a metering section comprising a main hole 52 and two aside holes 54.

The diffusion cavity 114 is downstream of the main hole 52 and side holes 54 and defines an axis such as a central axis 70. Some cooling air diffuses away from the central axis 70 in the lateral direction before exiting the cooling channel array 110 through the outlet 66 as indicated by the arrows A in FIG. 8. The perimeter 68 of the outlet 66 is roughly triangular and comprises a trailing edge 72 and two opposing lateral edges 74 that extend from each end 76 of the trailing edge 72 and converge at an apex 78.

The diffusion cavity 114 is defined by a face 115 carried by the component wall 48. The diffusion cavity face 115 congruently forms into the outer surface 46 of the wall 48 at a perimeter 68 that defines the outlet 66. Unlike the embodiment of FIGS. 4 and 5, the diffusion cavity face 115 includes a raised, contoured section 116 located generally away from the outlet 66 that helps define two or more lobes 118, 120. The face 115 also includes first and second outer surfaces 122, 126.

The lobes 118, 120 are channel-like spaces through which the cooling air may flow. The lobes 118, 120 are not entirely distinct, but rather meld together to form the diffusion cavity 114. The lobes 118, 120 may run substantially parallel to the central axis 70 or, as shown in FIG. 8, they may diverge from the central axis 70 as they approach the trailing edge 72. The raised contoured section 116 may be symmetrical with respect to the central axis 70 and have its maximum convexity at the central axis 70. The raised contoured section 116 may comprise first and second slightly convex (when viewed from the vantage point of the outlet 66) side surfaces 124, 128 that meet at the central axis 70.

The lobes 118, 120 generally are defined by their surrounding surfaces, including the raised contoured section 116. For example, lobe 118 is at least partly defined by the first outer surface 122 and the first convex side surface 124 and terminates at the trailing edge 72. Similarly, lobe 120 is at least partly defined by the second outer surface 126 and the second convex side surface 128 and terminates at the trailing edge 72. The multiple lobe configuration helps prevent vertices in the flowing air, and thus helps maintain a steady flow of cooling across the surface of the turbine blade. The cooling channel array 110 may comprise two, three or more lobes. In the cooling channel array 110 shown in FIG. 8, a longitudinal axis such as that defined by the main hole 52 may be substantially aligned with the central axis 70 of the diffusion cavity, while longitudinal axes defined by each of the side holes 54 may be substantially aligned with respective longitudinal axes defined by the diffusion cavity two lobes 118, 120.

Like the embodiment of FIGS. 4 and 5, the cooling channel array 110 comprises a "tri-hole" metering section comprising a main hole 52 and two side holes 54 that branch off of the main hole 52 downstream of a the cooling air inlet 56. The main hole 52 extends continuously from the inlet 56 to a main hole outlet 58 located on the face 115 of the diffusion cavity 114. Each side hole 54 has an inlet 60 and extends continuously to an outlet 62 located on the face 115 of the diffusion cavity 114. Each side hole 54 branches off of the main hole 52 at the side hole inlet 60.

The main hole 52 and the side holes 54 may each have a constant cross-sectional area. By contrast, the cross-sectional area of diffusion cavity 114 may increase in the direction of the outlet 66. The diameters of the side holes 54 typically are smaller than the diameter of the main hole 52. For example, the diameters of the side holes 54 may be between 0.5 and 0.72 times as large as the diameter of the main hole 52. The outlets 62 of the two side holes 54 may be laterally aligned with the main hole outlet 58, or upstream of, or downstream of, the main hole outlet 58.

Figure 9:
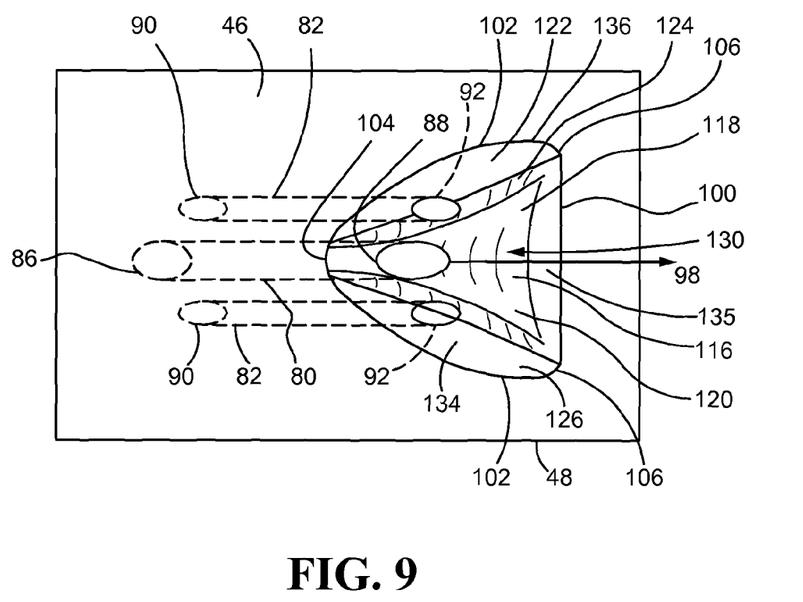
FIG. 9 is a top plan view of a component wall having a cooling channel array according to another alternative embodiment of the invention.

FIG. 9 is a top plan view of another embodiment of a cooling channel array 130 formed within the wall 48 of a component in a gas turbine engine. The cooling channel array 130 in FIG. 9 is basically a lobed version of the cooling channel array 80 of FIGS. 6 and 7. The cooling channel array 130 has a diffusion cavity 134 and a metering section comprising a main hole 86 and two aside holes 82.

The diffusion cavity 134 is downstream of the metering section and defines an axis such as a central axis 98. Some cooling air diffuses away from the central axis 98 in the lateral direction before exiting the cooling channel array 130 through an outlet 136. The perimeter of the outlet 136 is roughly triangular and comprises a trailing edge 100 and two opposing lateral edges 102 that extend from each end 106 of the trailing edge 100 and converge at an apex 104.

Like the embodiment of FIG. 8, the diffusion cavity 134 is defined by a face 135 carried by the component wall 48. The diffusion cavity face 135 congruently forms into the outer surface 46 of the wall 48 at a perimeter that defines the cooling channel array outlet 66. The diffusion cavity 135 forms a recessed space within the wall 48 and is partly defined by a first outer surface 122 and a second, opposing, outer surface 126. Also like the embodiment of FIG. 8, the diffusion cavity 134 includes a raised, contoured section 116 that helps define two lobes 118, 120. The lobes 118, 120 meld together to form the diffusion cavity 134. The lobes 118, 120 may run substantially parallel to the central axis 98 or, as shown in FIG. 9, they may diverge from the central axis 98 as they approach the trailing edge 100. The raised contoured section 116 may be symmetrical with respect to the central axis 98 and have its maximum convexity at the central axis 98.

The lobes 118, 120 generally are defined by their surrounding surfaces, including the raised contoured section 116. For example, lobe 118 is at least partly defined by the first outer surface 122 and a first convex side surface 124 and terminates at the trailing edge 100. Similarly, lobe 120 is at least partly defined by the second outer surface 126 and a second convex side surface 128 and terminates at the trailing edge 72. The cooling channel array 134 may comprise two, three or more lobes.

Like the embodiment shown in FIGS. 6 and 7, the cooling channel array 130 comprises a main hole 80 and two separate side holes 82. The main hole 82 and each side hole 84 has its own inlet and outlet. The main hole 82 extends from a main hole inlet 86 located on the inner surface of the wall 48 to a main hole outlet 88 located on the face 135 of the diffusion cavity 134. Each side hole 84 extends from a side hole inlet 90 located on the inner surface of the wall 48 to a side hole outlet 92 located on the face 135 of the diffusion cavity 134. The side holes 82 may or may not be parallel to the main hole 80. The side holes 82 may or may not have a smaller cross-sectional area than the main hole 80.

Figure 10:
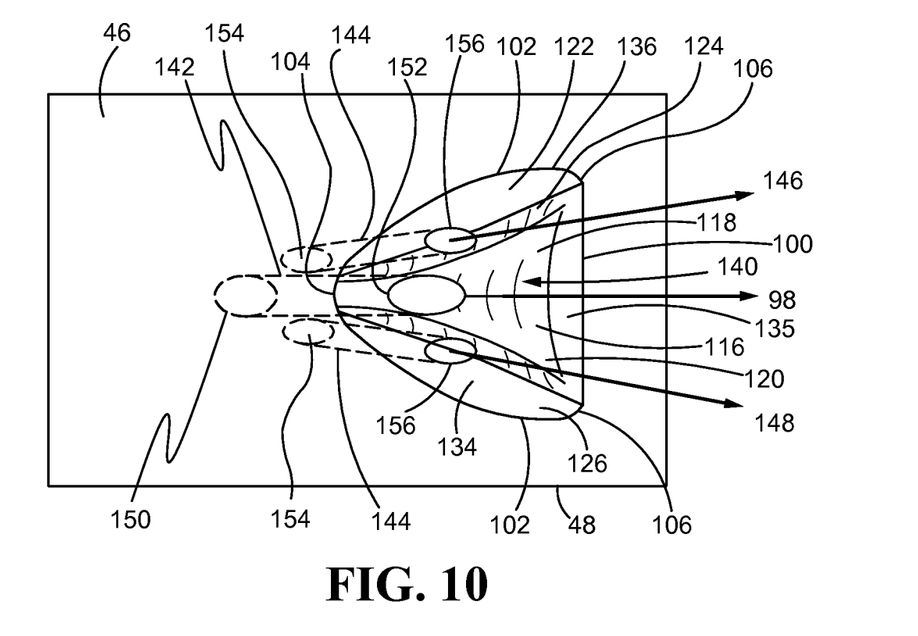
FIG. 10 is a top plan view of a component wall having a cooling channel array according to another alternative embodiment of the invention.

FIG. 10 is a top plan view of another embodiment of a cooling channel array 140. The cooling channel array 140 is similar to the cooling channel array 130 in FIG. 9 in that it comprises a diffusion cavity located upstream of a main hole and two separate side holes. Unlike the cooling channel array 130 of FIG. 9, the side holes 144 do not run parallel to the main hole 142, but instead diverge from the main hole 142.

The diffusion cavity 134 is defined by a face 135 carried by the component wall 48. Like the embodiment of FIG. 9, the diffusion cavity 134 includes a raised, contoured section 116 that helps define two lobes 118, 120 which meld together. The lobes 118, 120 diverge from the central axis 98 as they approach the trailing edge 100. The first lobe 118 defines an axis 146 and second lobe 120 defines an axis 148. The lobe axes 146, 148 diverge significantly from the center axis 98 and from each other.

The main hole 142 extends from a main hole inlet 150 located on the inner surface of the wall 48 to a main hole outlet 152 located on the face 135 of the diffusion cavity 134. Each side hole 144 extends from a side hole inlet 154 located on the inner surface of the wall 48 to a side hole outlet 156 located on the face 135 of the diffusion cavity 134.

The side holes 144 may be aligned with the respective lobe axes 146, 148. That is, one side hole 144 defines an axis aligned with the axis 146 of the first lobe 118 and the other side hole 144 defines an axis aligned with axis 148 of the second lobe 120.

Applications

The cooling system of the present invention may be used in gas turbine engines or any engines or machines where surfaces can be cooled via film cooling. For example and without limitation, the cooling system may be used to help cool the surface of a gas engine turbine blade or vane, BOAS, combustor liners, and augmenters.

While the present disclosure has shown and described details of exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A cooling channel array carried by a component wall of a gas turbine engine having a first surface and a second surface, the cooling channel array comprising:
   a diffusion cavity defined by a face carried by the component wall and having an outlet on the second surface, the diffusion cavity having two or more lobes, each lobe partly defined by a raised, contoured section on the face and each lobe defining a lobe axis diverging from a central axis of the diffusion cavity; and
   a metering section comprising a main hole and two or more side holes, the main hole having an inlet on the first surface and an outlet located on the face of the diffusion cavity, each side hole having an inlet and having an outlet located on the lobe axis of the face of the diffusion cavity.

2. The cooling channel array claim 1 wherein:
   at least one of the side hole inlets is located on the first surface.

3. The cooling channel array of claim 2 wherein:
   all of the side hole inlets are located on the first surface.

4. The cooling channel array of claim 2 wherein the number of side holes is two.

5. The cooling channel array of claim 2 wherein:
   the main hole and the side holes each have a constant flow cross-sectional area.

6. The cooling channel array of claim 2 wherein:
   the main hole and the side holes each have a diameter; and
   the diameters of the side holes are smaller than the diameter of the main hole.

7. The cooling channel array of claim 2 wherein:
   the side hole outlets are laterally aligned with the main hole outlet.

8. The cooling channel array of claim 2 wherein:
   the side hole outlets are laterally upstream or downstream of the main hole outlet.

9. The cooling channel array of claim 2 wherein:
   the side holes diverge from the main hole.

10. The cooling channel array of claim 2 wherein:
    the diffusion cavity has the central axis aligned with the main hole outlet, a side hole outlet located on a first lobe axis defined by a first lobe, and another side hole outlet located on a second lobe axis defined by a second lobe.

11. The cooling channel array of claim 1 wherein:
    at least one of the side holes branches off of the main hole.

12. The cooling channel array of claim 11 wherein:
    every side hole branches off of the main hole.

13. The cooling channel array of claim 11 wherein the number of side holes is two.

14. The cooling channel array of claim 11 wherein:
    the main hole and the side holes each have a constant flow cross-sectional area.

15. The cooling channel array of claim 11 wherein:
    the main hole and the side holes each have a diameter; and
    the diameters of the side holes are smaller than the diameter of the main hole.

16. The cooling channel array of claim 11 wherein:
    the side hole outlets are laterally aligned with the main hole outlet.

17. The cooling channel array of claim 11 wherein:
    the side hole outlets are laterally upstream or downstream of the main hole outlet.

18. The cooling channel array of claim 11 wherein:
    the diffusion cavity has the central axis aligned with the main hole, a side hole aligned with a first lobe axis defined by a first lobe, and another side hole aligned with a second lobe axis defined by a second lobe.

19. The cooling channel array of claim 1 wherein the component wall is part of a turbine blade.

20. The cooling channel array of claim 1 wherein the component wall is part of a turbine vane.

* * * * *